US012793388B2

(12) United States Patent
Zhang et al.

(10) Patent No.: US 12,793,388 B2
(45) Date of Patent: Nov. 10, 2026

(54) CO-TRAINING OF ACTION RECOGNITION MACHINE LEARNING MODELS

(71) Applicant: Google LLC, Mountain View, CA (US)

(72) Inventors: Bowen Zhang, Los Angeles, CA (US); Jiahui Yu, Jersey City, NJ (US); Christopher Fifty, San Francisco, CA (US); Wei Han, Redwood City, CA (US); Andrew M. Dai, Palo Alto, CA (US); Ruoming Pang, New York City, NY (US); Fei Sha, San Marino, CA (US)

(73) Assignee: Google LLC, Mountain View, CA (US)

( * ) Notice: Subject to any disclaimer, the term of this patent is extended or adjusted under 35 U.S.C. 154(b) by 330 days.

(21) Appl. No.: 18/716,912

(22) PCT Filed: Dec. 9, 2022

(86) PCT No.: PCT/US2022/081224
§ 371 (c)(1),
(2) Date: Jun. 5, 2024

(87) PCT Pub. No.: WO2023/114686
PCT Pub. Date: Jun. 22, 2023

(65) Prior Publication Data

US 2025/0037426 A1 Jan. 30, 2025

Related U.S. Application Data

(60) Provisional application No. 63/265,307, filed on Dec. 13, 2021.

(51) Int. Cl.
*G06V 10/764* (2022.01)
*G06V 10/774* (2022.01)

(52) U.S. Cl.
CPC .......... *G06V 10/764* (2022.01); *G06V 10/774* (2022.01)

(58) Field of Classification Search
USPC .......................................................... 382/159
See application file for complete search history.

(56) References Cited

U.S. PATENT DOCUMENTS

2017/0289624 A1* 10/2017 Avila ...................... G06F 16/78
2022/0384035 A1* 12/2022 Shi ........................ G06F 18/217
(Continued)

FOREIGN PATENT DOCUMENTS

EP 4557236 A1 * 5/2025 ............. G06V 20/41

OTHER PUBLICATIONS

Arnab et al., "ViViT: A Video Vision Transformer," 2021 IEEE/CVF International Conference on Computer Vision (ICCV), 2021, pp. 6816-6826.

(Continued)

*Primary Examiner* — Gabriel I Garcia
(74) *Attorney, Agent, or Firm* — McDonnell Boehnen Hulbert & Berghoff LLP

(57) ABSTRACT

A method includes obtaining video datasets each including pairs of a training video and a ground-truth action classification of the training video. The method also includes generating an action recognition model that includes a shared encoder model and action classification heads. A number of the action classifications heads may be equal to a number of the video datasets, and each action classification head may be configured to, based on an output of the shared encoder model, classify training videos sampled from a corresponding video dataset. The method also includes determining, by the action recognition model and for each training video sampled from the video datasets, an inferred action classification. The method further includes determin- (Continued)

ing a loss value based on the inferred action classifications and the ground-truth action classifications, and adjusting parameters of the action recognition model based on the loss value.

20 Claims, 7 Drawing Sheets

(56) References Cited

U.S. PATENT DOCUMENTS

2023/0206632 A1* 6/2023 Shah .................... G06V 10/764 382/181
2023/0360364 A1* 11/2023 Wu ...................... G06V 10/764

OTHER PUBLICATIONS

Duan et al., "Omni-sourced Webly-supervised Learning for Video Recognition," arXiv:2003.13042v2, Aug. 25, 2020, 26 pages.
Girdhar et al., "Video Action Transformer Network," 2019 IEEE/CVF Conference on Computer Vision and Pattern Recognition (CVPR), 2019, pp. 244-253.
International Searching Authority, International Search Report and Written Opinion mailed Apr. 25, 2023, issued in connection with International Patent Application No. PCT/US2022/081224, filed Dec. 9, 2022, 15 pages.
Koot et al., "VideoLightFormer: Lightweight Action Recognition using Transformers," arXiv:2107.00451v1, Jul. 1, 2021, 11 pages.
Liu et al., "Video Swin Transformer," arXiv:2106.13230v1, Jun. 24, 2021, 12 pages.
Neimark et al., "Video Transformer Network," arXiv:2102.00719v1, Feb. 1, 2021, 11 pages.
Zhou et al., "Domain Adaptive Ensemble Learning," IEEE Transactions on Image Processing, 2021, pp. 8008-8018, vol. 30.
Akbari et al., "VATT: Transformers for Multimodal Self-Supervised Learning from Raw Video, Audio and Text," 35th Conference on Neural Information Processing Systems (NeurIPS 2021), arXiv:2104.11178v3, Dec. 7, 2021, 20 pages.
Bertasius et al., "Is Space-Time Attention All You Need for Video Understanding?" NeurIPS, arXiv2102.05095v4, Jun. 9, 2021, 13 pages.
Carreira et al., "A Short Note about Kinetics-600," arXiv:1808.01340v1, Aug. 3, 2018, 6 pages.
Carreira et al., "A Short Note on the Kinetics-700 Human Action Dataset," arXiv:1907.06987v2, Oct. 17, 2019, 6 pages.
Carreira et al., "Quo Vadis, Action Recognition? A New Model and the Kinetics Dataset," In CVPR, arXiv:1705.07750v3, Feb. 12, 2018, 10 pages.
Deng et al., "ImageNet: A Large-Scale Hierarchical Image Database," CVPR, IEEE Computer Society Conference on Computer Vision and Pattern Recognition, Jun. 2009, 8 pages.
Devlin et al., "BERT: Pre-training of Deep Bidirectional Transformers for Language Understanding," NAACL, arXiv: 1810.04805v2, May 24, 2019, 16 pages.
Dosovitskiy et al., "An Image is Worth 16x16 Words: Transformers for Image Recognition at Scale," ICLR, arXiv:2010.11929v2, Jun. 3, 2021, 22 pages.
Fan et al., "Multiscale Vision Transformers," arXiv:2104.11227V1, Apr. 22, 2021, 18 pages.
Ging et al., COOT: Cooperative Hierarchical Transformer for Video-Text Representation Learning, 34th Conference on Neural Information Processing Systems (NeurIPS 2020), arXiv:2011.00597v1, Nov. 1, 2020, 27 pages.
Goyal et al., "The "something something" video database for learning and evaluating visual common sense," ICCV, arXiv:1706.04261v2, Jun. 15, 2017, 21 pages.
Kay et al., "The Kinetics Human Action Video Dataset," arXiv:1705.06950v1, May 19, 2017, 22 pages.
Kolesnikov et al., "Big Transfer (BiT): General Visual Representation Learning," ECCV, arXiv:1912.11370v3, May 5, 2020, 28 pages.
Kondratyuk et al., "MoViNets: Mobile Video Networks for Efficient Video Recognition," CVPR, arXiv:2103.11511v2, Apr. 18, 2021, 21 pages.
Krishna et al., "Dense-Captioning Events in Videos," CVPR, arXiv:1705.00754v1, May 2, 2017, 16 pages.
Li et al., "VALUE: A Multi-Task Benchmark for Video-and-Language Understanding Evaluation," arXiv:2106.04632v2, Aug. 18, 2021, 21 pages.
Liu et al., "Swin Transformer: Hierarchical Vision Transformer using Shifted Windows," ICCV, arXiv:2103.14030v2, Aug. 17, 2021, 14 pages.
Lu et al., VILBERT: Pretraining Task-Agnostic Visiolinguistic Representations for Vision-and-Language Tasks, NeurIPS, arXiv:1908.02265v1, Aug. 6, 2019, 11 pages.
Monfort et al., "Moments in Time Dataset: one million videos for event understanding," PAMI, arXiv:1801.03150v3, Feb. 16, 2019, 8 pages.
Ryoo et al., "TokenLearner: What Can 8 Learned Tokens do for Images and Videos?" NeurIPS, arXiv:2106.11297v4, Apr. 3, 2022, 16 pages.
Schüldt et al., "Recognizing human actions: A local SVM Approach," Proceedings of the 17th International Conference on Pattern Recognition (ICPR'04), Sep. 2004, 6 pages.
Simonyan et al., "Two-Stream Convolutional Networks for Action Recognition in Videos," NeurIPS, arXiv:1406.2199v2, Nov. 12, 2014, 11 pages.
Su et al., "VI-BERT: Pre-training of Generic Visuallinguistic Representations," ICLR, arXiv: 1908.08530v4, Feb. 18, 2020, 16 pages.
Touvron et al., "Training data-efficient image transformers & distillation through attention," ICML, arXiv:2012. 12877v2, Jan. 15, 2021, 22 pages.
Tran et al., "Learning Spatiotemporal Features with 3D Convolutional Networks," ICCV, arXiv:1412.0767v4, Oct. 7, 2015, 16 pages.
Wang et al., "TDN: Temporal Difference Networks for Efficient Action Recognition," CVPR, arXiv:2012.10071v2, Apr. 1, 2021, 13 pages.
Zhai et al., "Scaling Vision Transformers," arXiv:2106.04560v2, Jun. 20, 2022, 31 pages.
Zhang et al., "VidTr: Video Transformer Without Convolutions," CVPR, arXiv:2104.11746v2, Oct. 15, 2021, 11 pages.

* cited by examiner

CO-TRAINING OF ACTION RECOGNITION MACHINE LEARNING MODELS

CROSS REFERENCE TO RELATED APPLICATIONS

This application is a National Stage Application under 35 U.S.C. § 371 and claims priority to International Patent Application No. PCT/US2022/081224, filed Dec. 9, 2022, and titled "Co-Training of Action Recognition Machine Learning Models," which claims priority to U.S. provisional patent application No. 63/265,307, filed on Dec. 13, 2021, each of which is hereby incorporated by reference as if fully set forth in this description.

BACKGROUND

Machine Learning models may be used to process various types of data, including images, video, time series, text, and/or point clouds, among other possibilities. Improvements in the machine learning models and/or the training processes thereof may allow the models to carry out the processing of data faster and/or utilize fewer computing resources for the processing, among other benefits.

SUMMARY

An action recognition model may be configured to determine classifications for videos. In order to generate generalized, task-agnostic representations of the videos, at least some components of the action recognition model may be trained using multiple different training datasets. The training datasets may include, for example, multiple different video datasets, and/or at least one video dataset and an image dataset. Using multiple different video datasets may improve learning of temporal representations that are useful for multiple different tasks, while using a video dataset in combination with an image dataset may improve learning and/or maintenance of robust spatial representations that are useful for the multiple different tasks, among other benefits.

In a first example embodiment, a method may include obtaining a plurality of video datasets each including a plurality of pairs of (i) a training video and (ii) a corresponding ground-truth action classification of the training video. The method may also include generating an action recognition model that includes a shared encoder model and a plurality of action classification heads. A number of the plurality of action classifications heads may be equal to a number of the plurality of video datasets. Each respective action classification head of the plurality of action classification heads may be configured to, based on an output of the shared encoder model, classify training videos sampled from a corresponding video dataset of the plurality of video datasets. The method may additionally include determining, by the action recognition model and for each respective training video of a plurality of training videos sampled from the plurality of video datasets, a corresponding inferred action classification. The method may further include determining a loss value based on the corresponding inferred action classification and the corresponding ground-truth action classification of each respective training video of the plurality of training videos, and adjusting one or more parameters of the action recognition model based on the loss value.

In a second example embodiment, a method may include obtaining an input video and determining, by an action recognition model and based on the input video, a first action classification for the input video. The action recognition model may include a shared encoder model and may have been trained using a plurality of action classification heads. A number of the plurality of action classifications heads used to train the action recognition model may be equal to a number of a plurality of video datasets used to train the action recognition model. Each respective action classification head of the plurality of action classification heads may be configured to, based on an output of the shared encoder model, classify training videos sampled from a corresponding video dataset of the plurality of video datasets. The method may also include outputting the first action classification.

In a third example embodiment, a system may include a processor and a non-transitory computer-readable medium having stored thereon instructions that, when executed by the processor, cause the processor to perform operations in accordance with the first example embodiment and/or the second example embodiment.

In a fourth example embodiment, a non-transitory computer-readable medium may have stored thereon instructions that, when executed by a computing device, cause the computing device to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
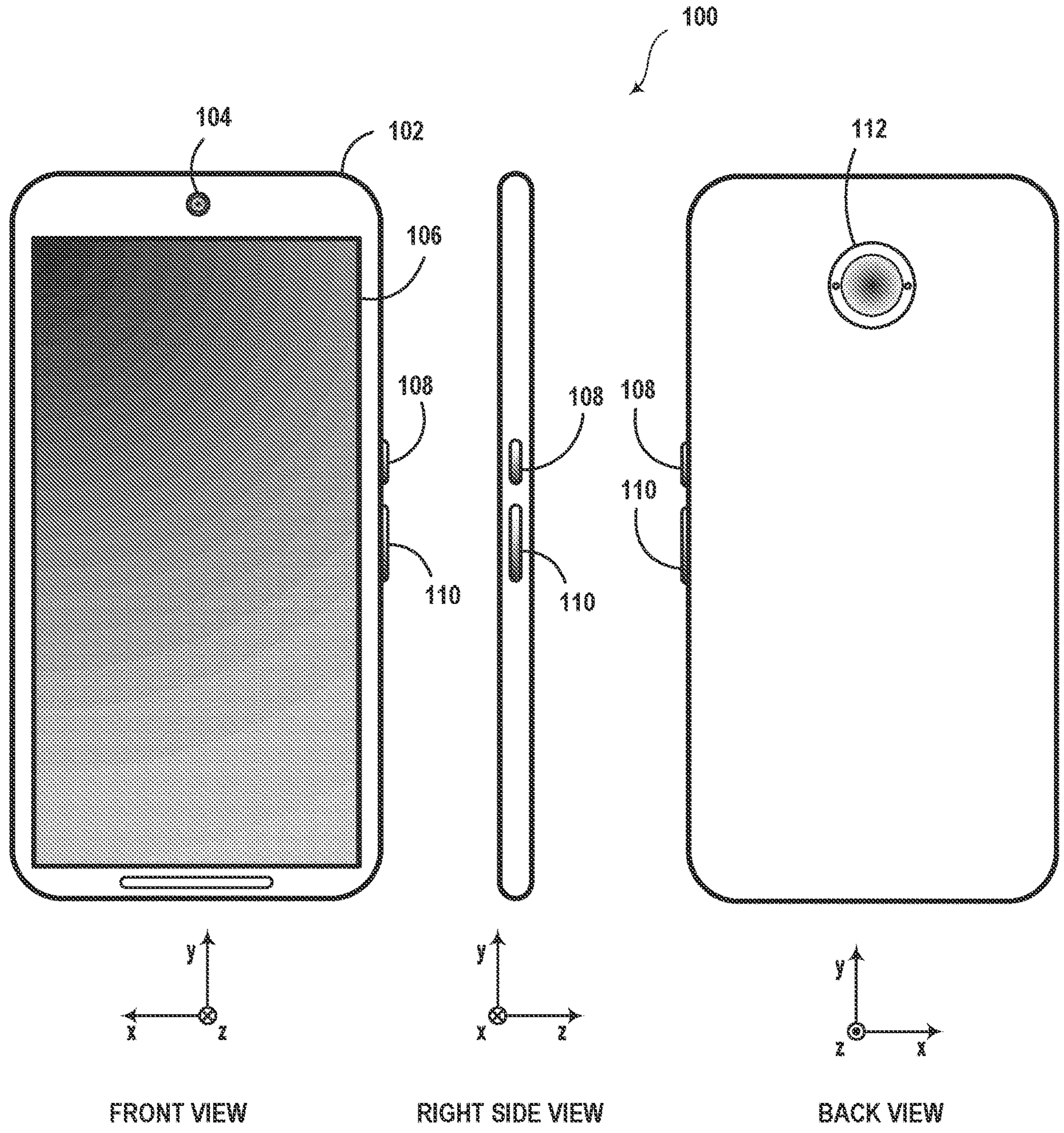
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Action recognition may involve determining a classification of a video. The classification may be based on temporal information present in a video, which includes a sequence of a plurality of image frames, that is otherwise absent from a single image. Thus, the classification of the video may be indicative of an action, activity, and/or other temporally-varying occurrence. The action, activity, and/or other temporally-varying occurrence may involve human actor(s) and/or non-human actor(s), such as animal(s), robot(s), inanimate object(s), and/or portions thereof. In some cases, when the classification of the video is expressed as text, the classification of the video may include at least one verb that is descriptive of the action, activity, and/or other temporally-varying occurrence. Action recognition may be used to facilitate video retrieval, video captioning, and/or video question-and-answer applications, among other possibilities.

Video action recognition may be performed by a machine learning-based action recognition model. The action recognition model may include an encoder configured to process a video and generate a latent space representation thereof (e.g., a vector space embedding of the video). A classification head (e.g., a multilayer perceptron) may be configured to generate, based on the latent space representation, a classification for the video. The action recognition model may be pre-trained using a pre-training image dataset, and subsequently fine-tuned using an action recognition video dataset. However, training the action recognition model in this manner may have several drawbacks.

First, because each video dataset may pertain to and/or be representative of a predefined range of actions and/or classes, fine-tuning of the action recognition model using a single video dataset might not result in a general-purpose action recognition model, resulting instead in a model that might be well-suited only for the predefined range of actions and/or classes. Second, because the spatial image content of image frames of a video may be redundant, a given video dataset may include less varied information about scene appearance structure than many image datasets. This may allow the action recognition model to over fit to the given video dataset, and may diminish the model's capability (initially developed during pre-training on the pre-training image dataset) to generate useful spatial representations. Accordingly, an action recognition model that has been trained using a first task-specific video dataset might not be usable for other different tasks because the latent space representations generated thereby might lack at least some information that is useful and/or necessary for the other different tasks.

Accordingly, the action recognition model may instead be jointly trained using multiple training datasets. For example, the action recognition model may initially be pre-trained using a pre-training image dataset, and may subsequently be jointly trained using the multiple training datasets. In one implementation, the multiple training datasets may include a plurality of video datasets that may differ in, for example, the scenes (e.g., objects and/or backgrounds), motions, classes, tasks, and/or other properties represented thereby. In another implementation, the multiple training datasets may include one or more video datasets and one or more co-training image datasets.

To allow for training using multiple training datasets, the action recognition model may be configured to include the shared encoder model and a plurality of classification heads. Specifically, during training, a number of the classification heads may be equal to a number of different training datasets, with each respective classification head being configured to generate, based on an output of the shared encoder model, classifications for a corresponding training dataset. For example, there may be a one-to-one mapping between the classification heads and the training datasets. Accordingly, this arrangement may condition the shared encoder model to generate latent space representations that are usable across a wide range of tasks, as represented at least by the multiple training datasets. Additionally, in some cases, this arrangement may result in better test-time performance on a given training dataset than could otherwise be achieved by training using only the given dataset.

The training of the action recognition model may be carried out over a plurality of epochs, each of which may include a corresponding batch (e.g., mini-batch) formed by sampling the training datasets. In some implementations, each batch may include at least one sample selected from each of the training datasets. Thus, at each epoch, parameters of the action recognition model may be updated based on at least some information from each training dataset, which may prevent any single dataset from dominating a given epoch and possibly causing the action recognition to forget prior learning. For example, each batch may have a predefined size (e.g., 128 samples per batch), and a number of samples selected from a given training dataset may be proportional to a size of the dataset. Thus, any given sample may be approximately equally likely to be selected for training as part of a given epoch.

After training of the action recognition model has been completed, one or more of the classification heads may be discarded from the model. For example, an action recognition model deployed to perform a specific task may include the shared encoder model and a task-specific classification head corresponding to the specific task, while other classification heads corresponding to other tasks may be discarded to reduce a size of the final model used at inference time. In one example, the specific task may correspond to one or more of the datasets used for training, and thus the task-specific classification head may be one of the plurality of classification heads used during training. In another example, the specific task might not correspond to one or more of the datasets used in training, and thus a new task-specific classification head may be trained to interpret the latent space representations generated by the shared encoder model. Parameters of the shared encoder model may be held fixed while the new task-specific classification head is being trained, thus preserving the information learned at training time.

In some implementations, the shared encoder model may be a transformer-based and/or a transformer-like model. For example, the shared encoder model may include a spatio-temporal transformer model that includes a plurality of attention blocks, each of which may include a temporal attention layer and a spatial attention layer. The temporal attention layer may be configured to determine temporal attention value(s) between different image frames of a video, while the spatial attention layer may be configured to determine spatial attention value(s) between different parts of one image frame of a video.

During pre-training based on the pre-training image dataset, spatial parameters of the spatio-temporal transformer may be adjusted, while temporal parameters of the spatio-temporal transformer may be held fixed. During co-training based on (i) two or more video datasets and/or (ii) one or more video datasets and one or more co-training image datasets, both the spatial parameters and the temporal parameters may be adjusted. Notably, by treating images of the co-training image dataset as single-frame videos, the spatio-temporal transformer model may be configured to process both videos and single images using the same architecture (i.e., without modifications thereto to accommodate image data), thereby facilitating training.

II. Example Computing Devices and Systems

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing device 100 a predetermined distance, or according to a predetermined capture schedule.

Figure 2:
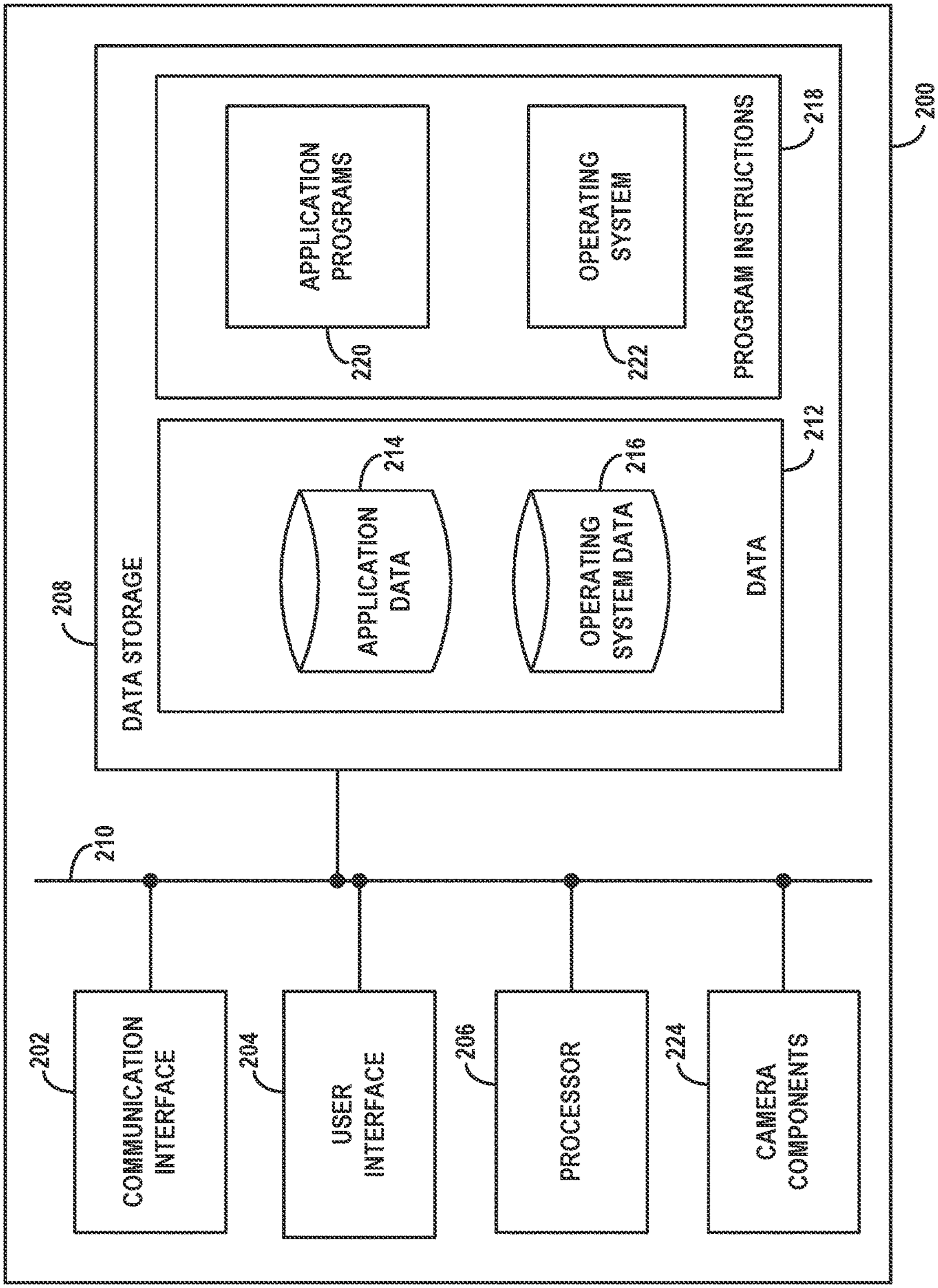
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, server, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port, among other possibilities. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)), among other possibilities. However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, LED, and/or OLED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and/or components configured for capturing of images in the infrared light spectrum (e.g., electromagnetic radiation having a wavelength of 701 nanometers-1 millimeter), among other possibilities. Camera components 224 may be controlled at least in part by software executed by processor 206.

III. Example Action Recognition Model

Figure 3:
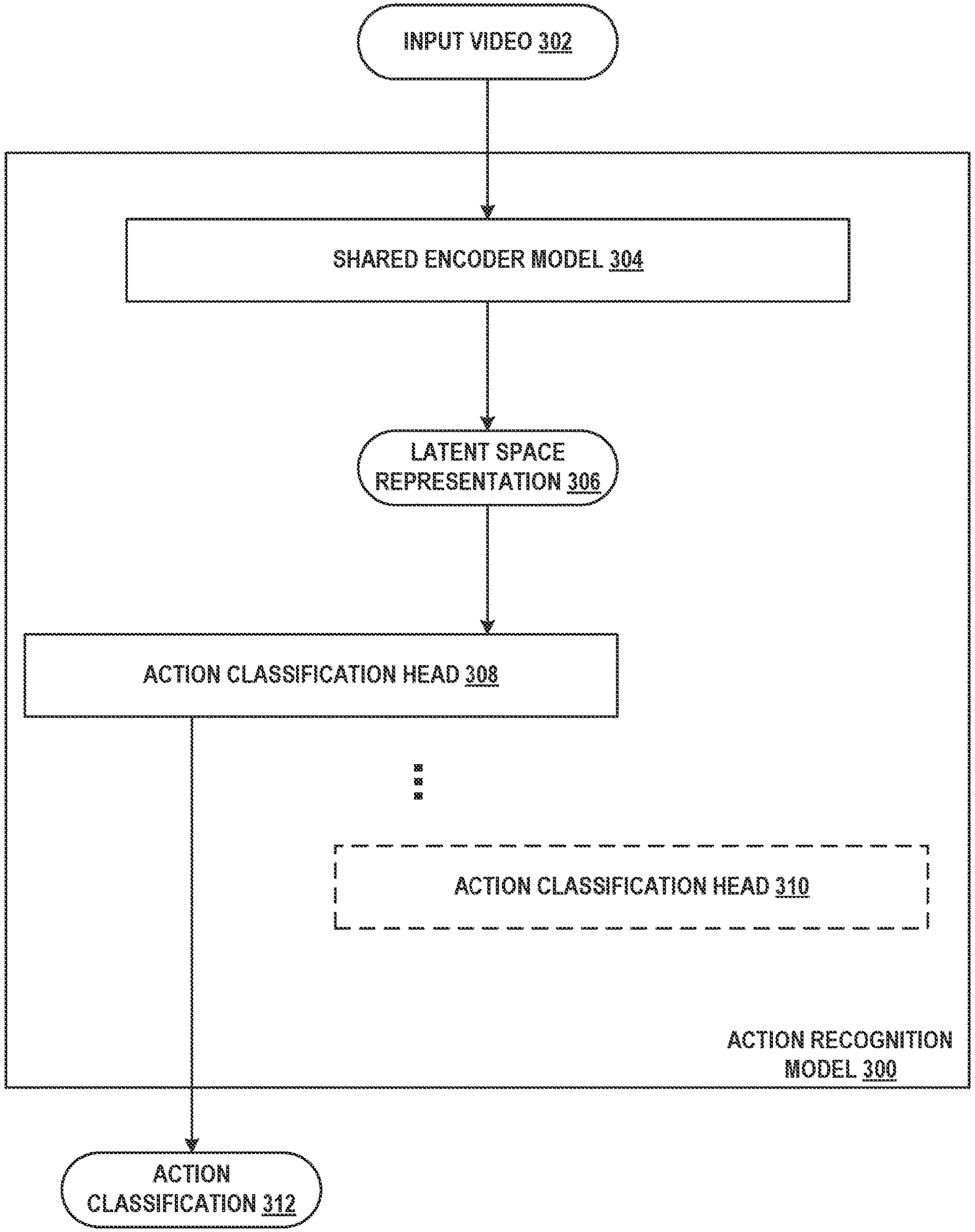
FIG. 3 illustrates an action recognition model, in accordance with examples described herein.

FIG. 3 illustrates an example action recognition model that may be configured to generate action classifications for videos. Specifically, action recognition model 300 may include shared encoder model 304 and at least action classification head 308. In some cases, action recognition model may additionally and/or alternatively include other action classification heads, such as action classification head 310. Action recognition model 300 may be configured to generate action classification 312 based on input video 302.

Shared encoder model 304 may be configured to generate latent space representation 306 based on input video 302. In some implementations, shared encoder model 304 may include a transformer-based model. In one example, the transformer-based model may include a TimeSFormer model, as described in a paper titled "Is space-time attention all you need for video understanding?," authored by Bertasius et al., and published as arXiv:2102.05095. In another example, the transformer-based model may include a ViViT model, as described in a paper titled "ViViT: A Video Vision Transformer," authored by Arnab et al., and published as arXiv:2103.15691. In a further example, the transformer-based model may include a MVIT model, as described in a paper titled "Multiscale Vision Transformers," authored by Fan et al., and published as arXiv:2104.11227. Shared encoder model 304 may additionally or alternatively include other transformer-based model architectures.

Accordingly, shared encoder model 304 may be configured to implement a multi-head attention architecture, which may be expressed as $$MHA(K, Q, V) = FFN\left(Softmax\left(\frac{Q^T K}{\sqrt{d}}\right)V\right),$$

where K represents a key tensor, Q represents a query tensor, V represents a value tensor, and FFN( ) represents a feed-forward neural network.

In other implementations, shared encoder model 304 may additionally or alternatively include a convolution-based model. In one example, the convolution-based model may include an Inflated three dimensional (3D) ConvNet (13D) model, as described in a paper titled "Quo vadis, action recognition? A new model and the kinetics dataset.," authored by Carreira et al., and published as arXiv:1705.07750. In another example, the convolution-based model may include a two-stream ConvNet model, as described in a paper titled "Two-Stream Convolutional Networks for Action Recognition in Videos," authored by Simonyan et al., and published as arXiv:1406.2199. In a further example, the convolution-based model may include a 3D ConvNet model, as described in a paper titled "Learning Spatiotemporal Features with 3D Convolutional Networks," authored by Tran et al., and published as arXiv:1412.0767. Shared encoder model 304 may additionally or alternatively include other convolution-based model architectures.

Latent space representation 306 may include a tensor that represents input video 302 in a latent space. The tensor may be, for example, a vector, and may thus be viewed as an embedding of input video 302 in a latent vector space. Latent space representation 306 may provide a compressed and/or condensed representation of various properties and/or attributes of input video 302 that are useful for action classification heads 308-310 in performing one or more corresponding tasks. Latent space representation 306 may alternatively be referred to as an embedding.

Action classification head 308 may be configured to generate action classification 312 of input video 302 based on latent space representation 306. For example, action classification head 308 may be configured to classify input video 302 into one of a predetermined number of classes associated with a corresponding task. The corresponding task may include, for example, video retrieval, video captioning, and/or video question-and-answer, among other possibilities. In some implementations, action classification head 310 may be configured to generate another action classification of input video 302 as part of another task for which action classification head 310 has been trained. In some cases, action classification head 310 may have been used while training action recognition model 300, but may be discarded thereafter, and thus might not form part of action recognition model 300 at inference time.

IV. Example Training System

Figure 4:
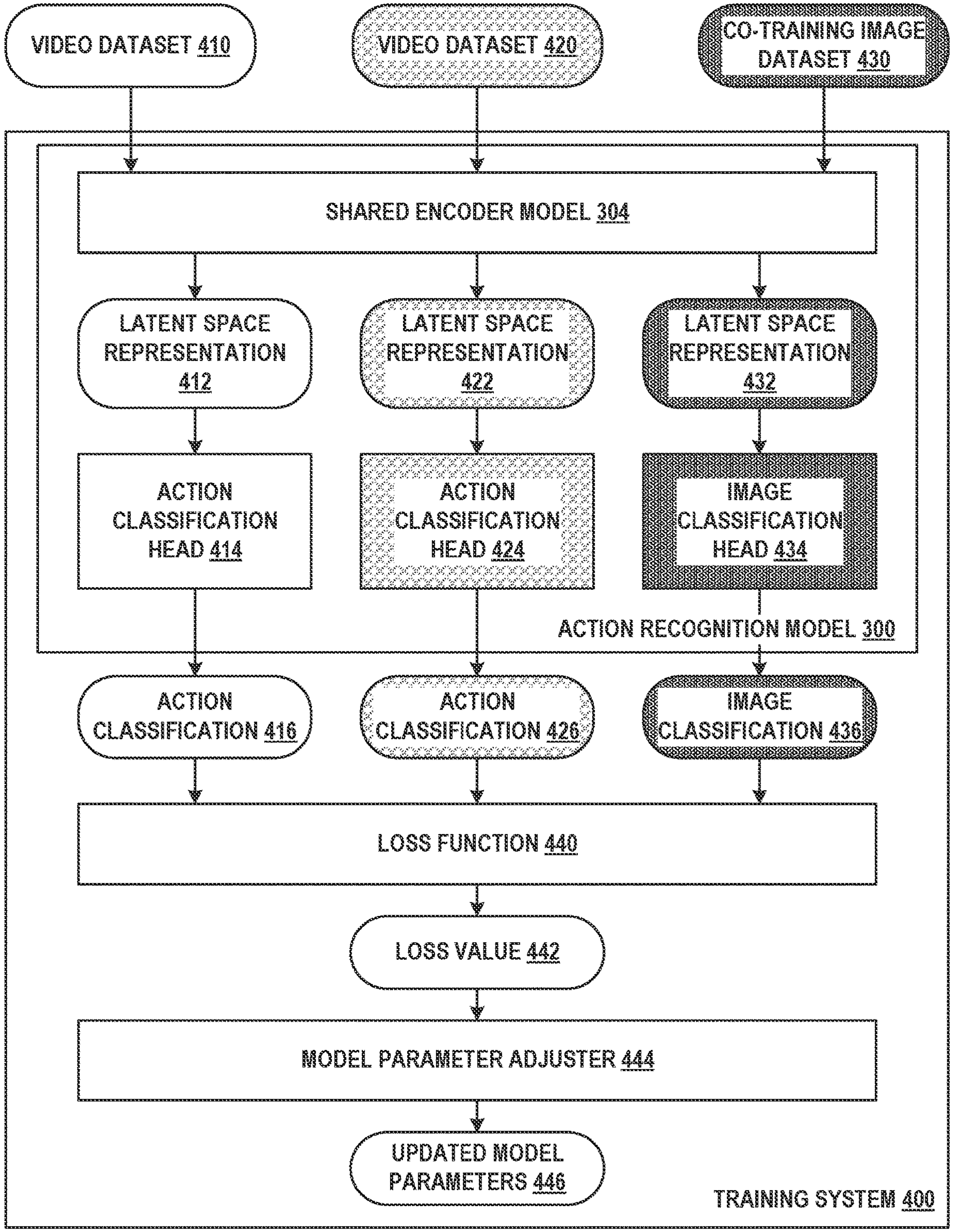
FIG. 4 illustrates a training system for an action recognition model, in accordance with examples described herein.

FIG. 4 illustrates an example training system that may be used to train action recognition model 300. Specifically, training system 400 may include action recognition model 300, loss function 440, and model parameter adjuster 444. Training system 400 may be configured to generate, based on video dataset 410, video dataset 420, and/or co-training image dataset 430, a trained version of action recognition model 300.

Video dataset 410 and video dataset 420 may each include a plurality of pairs of (i) a training video and (ii) a corresponding ground-truth action classification of the training video. Video dataset 410 may differ from video dataset 420 in that the training videos in these two datasets may represent different scenes (e.g., objects and/or backgrounds), actions, actors, and/or classifications, and/or may otherwise have different attributes and/or properties. Some of the differences in the attributes and/or properties of video datasets 410 and 420 may be a result of a manner in which the corresponding training videos have been obtained. Co-training image dataset 430 may include a plurality of pairs of (i) a co-training image and (ii) a corresponding ground-truth image classification thereof. In some implementations, training system 400 may be configured to train action recognition model 300 using additional video datasets not shown in FIG. 4.

A sample from an ith video dataset of a plurality of video datasets may be expressed as $$(x^i_{video}, y^i_{video}) \sim D^i_{video}, \text{ where } x^i_{video}$$

represents the training video, $$y^i_{video}$$

represents the corresponding ground-truth action classification thereof, and $$D^i_{video}$$

represents the ith video dataset. A sample from an jth co-training image dataset of a plurality of co-training image datasets may be expressed as $$(x^j_{image}, y^j_{image}) \sim D^j_{image}, \text{ where } x^j_{image}$$

represents the training image, $$y^j_{image}$$

represents the corresponding ground-truth image classification thereof, and $$D^{j}_{image}$$

represents the jth co-training image dataset. In some implementations, a number of samples selected from each video dataset and/or each co-training image dataset may be proportional to a total number of samples in the dataset. Thus, for any given training batch, each training sample may be equally likely to be selected for the given training batch.

Shared encoder model 304 may be configured to generate latent space representation 412 based on at least one training video sampled from video dataset 410, latent space representation 422 based on at least one training video sampled from video dataset 420, and/or latent space representation 432 based on at least one training image sampled from co-training image dataset 430. In some implementations, two or more of datasets 410, 420, and 430 may be used to train action recognition model 300. In one example, action recognition model 300 may be jointly trained using a plurality of video datasets. In another example, action recognition model 300 may be jointly trained using one or more video datasets and one or more co-training image datasets.

The latent space representation of $$x^{i}_{video}$$

may be expressed as $$t^{i}_{video} = f\left(x^{i}_{video}\right),$$

where $f(\ )$ represents a learned function applied by shared encoder model 304. The latent space representation of $$x^{j}_{image}$$

may be expressed as $$t^{j}_{image} = f\left(x^{j}_{image}\right).$$

Action classification head 414 may be configured to generate action classification 416 of the at least one training video sampled from video dataset 410. Action classification head 424 may be configured to generate action classification 426 of the at least one training video sampled from video dataset 420. Image classification head 434 may be configured to generate image classification 436 of the at least one training image sampled from co-training image dataset 430.

Thus, action classification head 414 may be specific to video dataset 410, action classification head 424 may be specific to video dataset 420, and image classification head 434 may be specific to co-training image dataset 430, as indicated by the fill patterns thereof. A given classification head may be specific to a corresponding dataset in that a range of possible outputs of the given classification head may be based on and/or correspond to a range of ground-truth classifications represented by the corresponding dataset.

The action classification of $$x^{i}_{video}$$

may be expressed as $$c^{i}_{video} = g_i\left(t^{i}_{video}\right),$$

where $g_i(\ )$ represents a learned function applied by an action classification head corresponding to the ith video dataset. The image classification of $$x^{j}_{image}$$

may be expressed as $$c^{j}_{image} = g_j\left(t^{j}_{image}\right),$$

where $g_j(\ )$ represents a learned function applied by an image classification head corresponding to the jth co-training image dataset. In some implementations, $g_i(\ )=MLP_i(\ )$ and/or $g_j(\ )=MLP_j(\ )$ where $MLP(\ )$ represents a multi-layer perceptron.

An accuracy with which action recognition model 300 classifies training video samples and/or co-training image samples may be quantified by loss function 440. Specifically, loss function 440 may be configured to generate loss value 442 based on two or more of: (i) action classification 416 and a corresponding ground-truth classification of the training video to which action classification 416 corresponds, (ii) action classification 426 and a corresponding ground-truth classification of the training video to which action classification 426 corresponds, and/or (iii) image classification 436 and a corresponding ground-truth classification of the co-training image to which image classification 436 corresponds. Loss function 440 may include, for example, a cross-entropy loss function. In some implementations, loss value 442 may be based on a weighted sum of a plurality of dataset-specific loss values corresponding to two or more of datasets 410, 420, and/or 430, where the relative weights of the dataset-specific loss values may be an adjustable training parameter.

For example, a video loss term associated with the ith video dataset may be expressed as $$l^{i}_{video} = l\left(\left\{y^{i}_{video}\right\}, \left\{c^{i}_{video}\right\}\right),$$

where $l(\ )$ represents, for example, the cross-entropy loss function, among other possible losses. A co-training image loss term associated with the jth co-training image dataset may be expressed as $$l^{j}_{image} = l\left(\left\{y^{j}_{image}\right\}, \left\{c^{j}_{image}\right\}\right).$$

A total video loss term across the plurality of video datasets may be expressed as $$l_{video} = \sum_i w^i_{video} l^i_{video}, \text{ where } w^i_{video}$$

represents a modifiable weight associated with the ith video dataset. A total image loss term across the plurality of co-training image datasets may be expressed as $$l_{image} = \sum_j w^j_{image} l^j_{image},$$

where $$w^j_{image}$$

represents a modifiable weight associated with the jth co-training image dataset. A combined video and co-training image loss term may be expressed as $$l_{image\_video} = \sum_i w^i_{video} l^i_{video} + \sum_j w^j_{image} l^j_{image}.$$

Model parameter adjuster 444 may be configured to determine updated model parameters 446 based on loss value 442, and possibly other loss values that may be determined by other loss functions of training system 400. Updated model parameters 446 may include one or more updated parameters of any trainable component of action recognition model 300. Model parameter adjuster 444 may be configured to determine updated model parameters 446 by, for example, determining a gradient of loss function 440. Based on this gradient and loss value 442, model parameter adjuster 444 may be configured to select updated model parameters 446 that are expected to reduce loss value 442, and thus improve performance of action recognition model 300.

In particular, training system 400 may be configured to adjust shared encoder model 304 to generate latent space representations that are usable by classification heads 414, 424, and/or 434 to generate accurate classifications of corresponding input data, while also adjusting classification heads 414, 424, and 434 to more accurately interpret the latent space representation generated by shared encoder model 304. Specifically, by jointly considering multiple datasets (e.g., 410, 420, and/or 430), performance of action recognition model 300 may be simultaneously improved with respect to multiple tasks. Thus, the latent space representations generated by shared encoder model 304 may include more information and/or information that is useful with respect to a larger number of video and/or image processing tasks.

For example, model parameter adjuster 444 may be configured to determine one or more updated values for one or more spatial parameters $\theta_s$ of shared encoder model 304, and/or one or more temporal parameters $\theta_t$ of shared encoder model 304. Spatial parameters $\theta_s$ may be associated with a spatial portion and/or layer of shared encoder model 304 that is configured to compare (e.g., determine a spatial attention score between) different portions of a same image. Temporal parameters $\theta_t$ may be associated with a temporal portion and/or layer of shared encoder model 304 that is configured to compare (e.g., determine a temporal attention score between) different images. Thus, model parameter adjuster 444 may implement the function $(\theta_s, \theta_t)=\arg\min_{\theta^s,\theta_t} l_{video}$ or $(\theta_s, \theta_t)=\arg\min_{\theta_s,\theta_t}(l_{video}+l_{image})$.

After applying updated model parameters 446 to action recognition model 300, the operations discussed above may be repeated to compute another instance of loss value 442 and, based thereon, another instance of updated model parameters 446 may be determined and applied to action recognition model 300 to further improve the performance thereof. Such training of action recognition model 300 may be repeated until, for example, loss value 442 is reduced to below a target threshold loss value with respect to one or more training, testing, and/or benchmark datasets.

Training shared encoder model 304 using a plurality of different video datasets and/or co-training image datasets that differ from one another in various attributes and/or properties may allow shared encoder model 304 to learn to generate latent representation for a diverse range of possible inputs. That is, shared encoder model 304 may learn to generate latent representations that accurately and/or meaningfully represent a diverse range of spatiotemporal video contents, and may thus be useful in a wide range of potential tasks.

Additionally, when shared encoder model 304 includes a transformer-based model, which may include a relatively large number of trainable parameters when compared to other possible model architectures, the additional training data provided by using multiple different video and/or image datasets may provide the transformer-based model with sufficient training samples to prevent and/or reduce the likelihood of overfitting shared encoder model 304 to the training samples. By avoiding overfitting, shared encoder model 304 may generate latent representations that are more accurate and/or meaningful for tasks with respect to which shared encoder model 304 has not been specifically trained.

In some implementations, prior to training of action recognition model 300 based on video dataset 410, video dataset 420, and/or co-training image dataset 430, action recognition model 300 may be pre-trained using a pre-training image dataset. A sample from the pre-training image dataset may be expressed as $$\left(x^{pre-taining}_{image}, y^{pre-training}_{image}\right) \sim D^{pre-training}_{image}, \text{ where } x^{pre-training}_{image}$$

represents the pre-training image, $$y^{pre-training}_{image}$$

represents the corresponding ground-truth image classification thereof, and $$D^{pre-training}_{image}$$

represents the pre-training image dataset. The image classification of $$x^{pre-training}_{image}$$

may be expressed as $$c_{image}^{pre-training} = g_{pre-training}(f(x_{image}^{pre-training})),$$

where $g_{pre-training}(\ )$ represents a learned function applied by an image classification head corresponding to the pre-training image dataset.

A pre-training image loss term may be expressed as $$l_{image}^{pre-training} = l(\{y_{image}^{pre-training}\}, \{c_{image}^{pre-training}\}).$$

Model parameter adjuster 444 may be configured to determine one or more values for at least one of the spatial parameters $\theta_s$ of shared encoder model 304 based on the pre-training image loss term. Thus, model parameter adjuster 444 may pre-training implement the function $$\theta_S = \arg\min_{\theta_S} l_{image}^{pre-training}.$$

By pre-training shared encoder model 304 using the pre-training image dataset, training of at least the spatial portion of shared encoder model 304 may be at least partially completed when training on video datasets starts. For example, at least the spatial portion of shared encoder model 304 may be configured to generate intermediate (spatial) latent representations that accurately and/or meaningfully represent the attention between different portions of input image data. Thus, subsequent training based on video dataset 410, video dataset 420, and/or co-training image dataset 430 may include fewer training iterations, and thus utilize less energy and/or computational resources.

Additionally, by pre-training shared encoder model 304 using the pre-training image dataset, and subsequently continuing to train shared encoder model 304 using one or more co-training image datasets, the likelihood of shared encoder model 304 unlearning proficiencies gained during pre-training may be reduced and/or minimized. That is, jointly training shared encoder model 304 using both video datasets and co-training image datasets may allow shared encoder model 304 to maintain and/or improve the spatial representation capacity thereof, or at least prevent spatially redundant video data of the training video datasets from degrading the spatial representation capacity of shared encoder model 304. Thus, by maintaining and/or improving the spatial representation capacity of shared encoder model 304, training may involve fewer training iterations, and thus utilize less energy and/or computational resources.

In some implementations, when, as part of a first training batch, action recognition model 300 is being trained using one or more video datasets and independently of (i.e., without reliance on) any co-training image datasets, training system 400 may be configured to modify the temporal parameters $\theta_t$ of shared encoder model 304 while holding fixed the spatial parameters $\theta_s$ thereof. When, as part of a second training batch, action recognition model 300 is trained using both a video dataset and a co-training image dataset, training system 400 may be configured to modify both the temporal parameters $\theta_t$ and the spatial parameters $\theta_s$ of shared encoder model 304. Such an approach to training may further assist with maintaining and/or improving the spatial representation capacity of shared encoder model 304.

V. Example Encoder Model Architecture

Figure 5:
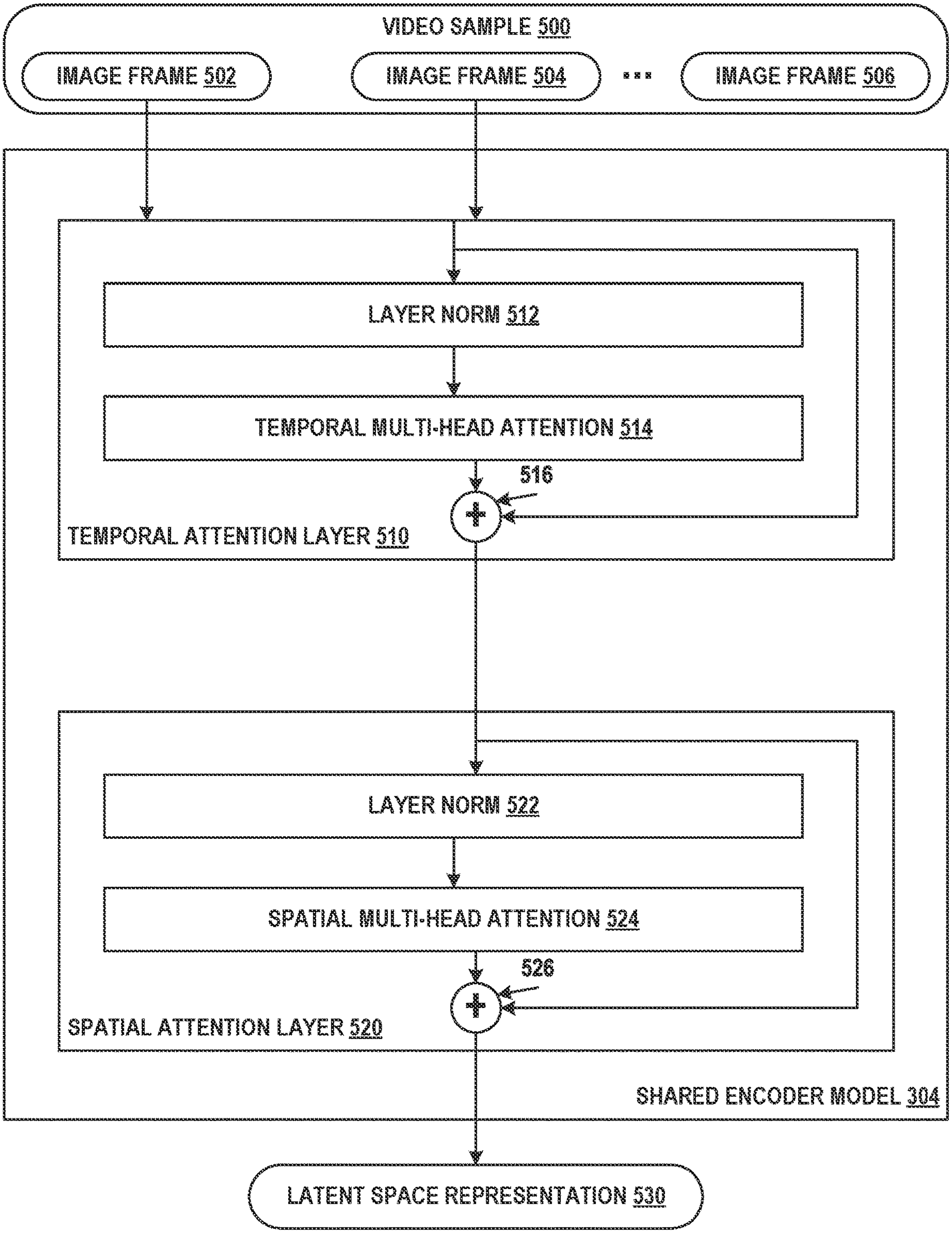
FIG. 5 illustrates an encoder model, in accordance with examples described herein.

FIG. 5 illustrates an example implementation of shared encoder model 304, and provides an example of a transformer-based architecture. Shared encoder model 304 may include temporal attention layer 510 and spatial attention layer 520. Shared encoder model 304 may be configured to generate latent space representation 530 based on video sample 500. Video sample 500 may represent, for example, input video 302 processed at inference time and/or a video sampled from a video dataset at training time (e.g., from video dataset 410). Video sample 500 may include image frame 502 and image frame 504 through image frame 506 (i.e., image frames 502-506).

Temporal attention layer may include layer norm 512, temporal multi-head attention 514, and adder 516. Spatial attention layer may include layer norm 522, spatial multi-head attention 524, and adder 526. Each of temporal attention layer 510 and spatial attention layer 520 may represent a plurality of stacked instances (referred to as "heads") of the components thereof. Each attention head may be executable in parallel and/or independently of other attention heads.

Layer norm 512 and layer norm 522 may each be configured to apply a respective layer normalization operation. Adder 516 may be configured to add the input of layer norm 512 and the output of temporal multi-head attention 514, thereby generating an input of temporal attention layer 510. Adder 526 may be configured to add the input of layer norm 522 and the output of spatial multi-head attention 524, thereby generating an output of spatial attention layer 520.

Temporal multi-head attention 514 may be configured to determine a temporal attention score based on a comparison of one or more portions of a first image frame to one or more portions of a second image frame that is different from the first image frame. For example, temporal multi-head attention 514 may be configured to determine a temporal attention score based on a comparison of one or more portions of image frame 502 to one or more portion of image frame 504. Performing the comparison may include determining at least one term of K, Q, or V of the multi-head attention based on image frame 502, and determining the other terms based on image frame 504, thus providing a comparison of the image content at different time steps of video sample 500. For example, the key tensor K may be based on image frame 502, the value tensor V may be based on image frame 504, and the query tensor Q may be based on image frame 502 or image frame 504. Temporal multi-head attention 514 may be defined at least in part by the one or more temporal parameters $\theta_t$ of shared encoder model 304.

Spatial multi-head attention 524 may be configured to determine a spatial attention score based on a comparison of one or more portions of the first image frame to one or more other portions of the first image frame. For example, spatial multi-head attention 524 may be configured to determine a spatial attention score based on a comparison of one or more portions of image frame 502 to one or more other portions of image frame 502. Performing the comparison may include determining the key tensor based on image frame 502, the value tensor based on image frame 502, and the query tensor based on image frame 502. That is, each of K, Q, or V of the multi-head attention may be based on image frame 502, thus providing a comparison of the image content of different portions of the same frame of video sample 500.

Spatial multi-head attention 524 may be defined at least in part by the one or more spatial parameters $\theta_s$ of shared encoder model 304.

When processing images (e.g., sampled from co-training image dataset 430), rather than videos, temporal attention layer 510 may be configured to treat each image as a single-frame video. Accordingly, each of K, Q, or V of the multi-head attention may be based on the same image, thus reducing the operation performed by temporal multi-head attention 514 to a feed-forward neural network. Accordingly, individual images may be processed by shared encoder model 304 without having to readapt and/or reconfigured a structure of shared encoder model 304 from processing multi-frame video data to processing single-frame images.

VI. Additional Example Operations

Figure 6:
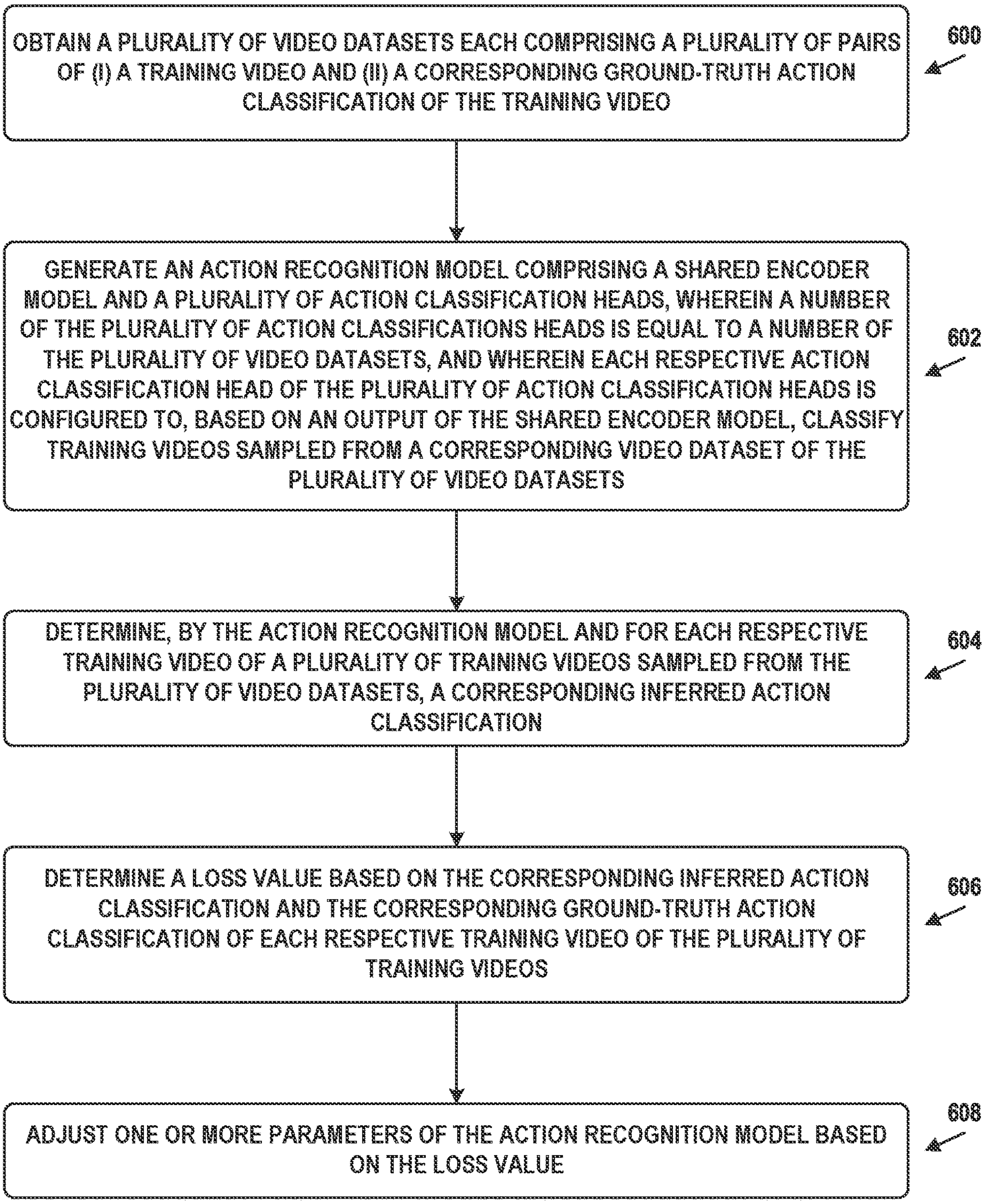
FIG. 6 illustrates a flow chart, in accordance with examples described herein.
Figure 7:
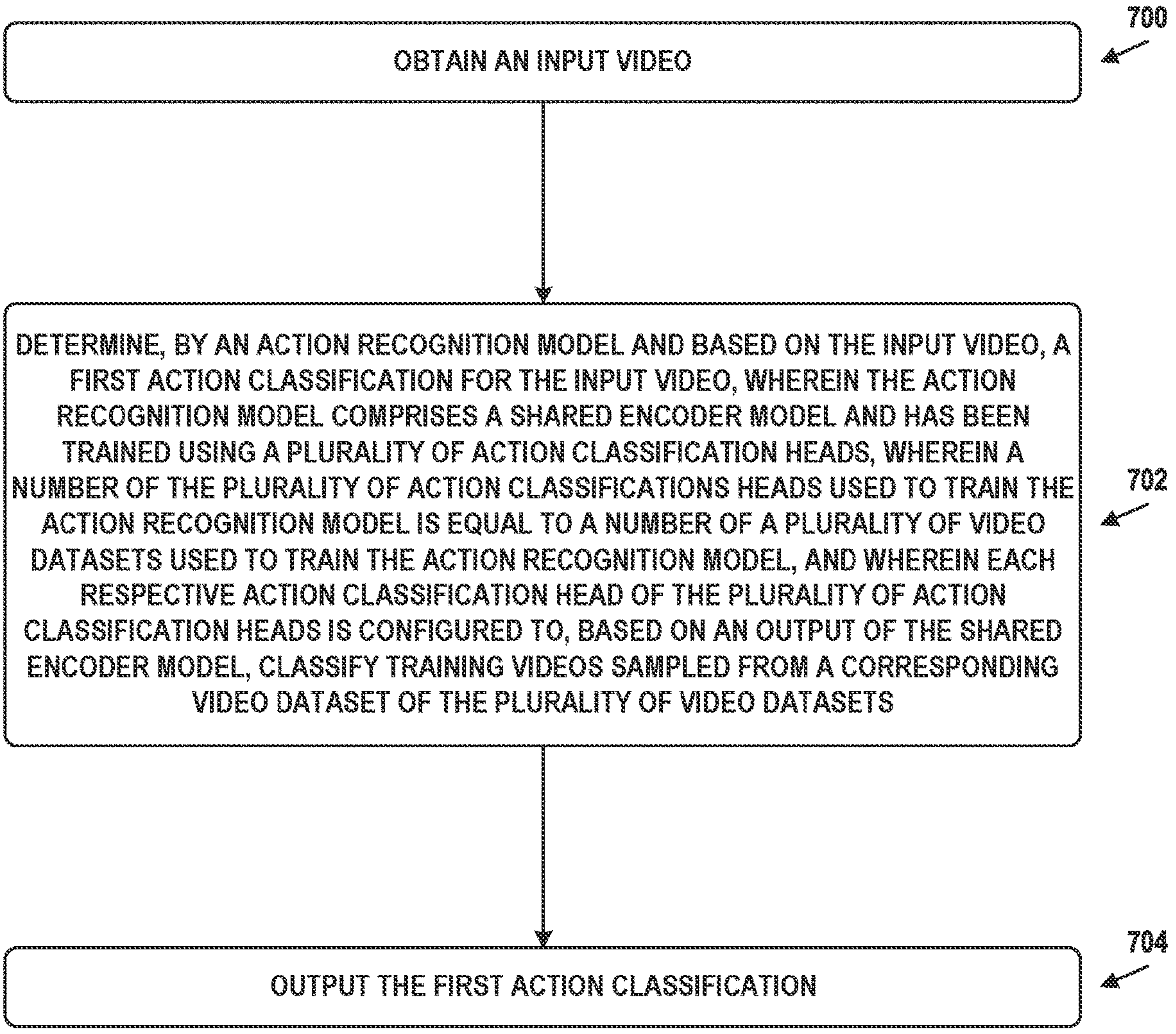
FIG. 7 illustrates a flow chart, in accordance with examples described herein.

FIG. 6 illustrates a flow chart of operations related to training an action recognition model to generate video classifications. FIG. 7 illustrates a flow chart of operations related to using a trained action recognition model to generate video classifications. The operations of FIGS. 6 and/or 7 may be carried out by computing device 100, computing system 200, action recognition model 300, and/or training system 400, among other possibilities. The embodiments of FIGS. 6 and/or 7 may be simplified by the removal of any one or more of the features shown therein. Further, these embodiments may be combined with features, aspects, and/or implementations of any of the previous figures or otherwise described herein.

Turning to FIG. 6, block 600 may involve obtaining a plurality of video datasets each including a plurality of pairs of (i) a training video and (ii) a corresponding ground-truth action classification of the training video.

Block 602 may involve generating an action recognition model that includes a shared encoder model and a plurality of action classification heads. A number of the plurality of action classifications heads may be equal to a number of the plurality of video datasets. Each respective action classification head of the plurality of action classification heads may be configured to, based on an output of the shared encoder model, classify training videos sampled from a corresponding video dataset of the plurality of video datasets.

Block 604 may involve determining, by the action recognition model and for each respective training video of a plurality of training videos sampled from the plurality of video datasets, a corresponding inferred action classification.

Block 606 may involve determining a loss value based on the corresponding inferred action classification and the corresponding ground-truth action classification of each respective training video of the plurality of training videos.

Block 608 may involve adjusting one or more parameters of the action recognition model based on the loss value.

In some embodiments, the shared encoder model may include a plurality of spatial parameters associated with processing of spatial properties of an input image data and a plurality of temporal parameters associated with processing of temporal properties of the input image data.

In some embodiments, a co-training image dataset may be obtained, and may include a plurality of pairs of (i) a co-training image and (ii) a corresponding ground-truth image classification thereof. A corresponding inferred image classification may be determined by the action recognition model for each respective co-training image of a plurality of co-training images sampled from the co-training image dataset. The action recognition model may further include a co-training image classification head connected to the shared encoder model and configured to classify, based on the output of the shared encoder model, co-training images sampled from the co-training image dataset. The loss value may be further based on the corresponding inferred image classification and the corresponding ground-truth image classification of each respective co-training image of the plurality of co-training images. Adjusting the one or more parameters of the action recognition model may include (i) adjusting one or more spatial parameters of the plurality of spatial parameters and (ii) adjusting one or more temporal parameters of the plurality of temporal parameters.

In some embodiments, a pre-training image dataset may be obtained, and may include a plurality of pairs of (i) a pre-training image and (ii) a corresponding ground-truth image classification thereof. A corresponding inferred image classification may be determined by the action recognition model for each respective pre-training image of a plurality of pre-training images sampled from the pre-training image dataset. The action recognition model may further include a pre-training image classification head connected to the shared encoder model and configured to classify pre-training images sampled from the pre-training image dataset. A second loss value may be determined based on the corresponding inferred image classification and the corresponding ground-truth image classification of each respective pre-training image of the plurality of pre-training images. One or more spatial parameters of the plurality of spatial parameters may be adjusted based on the loss value while keeping the plurality of temporal parameters fixed.

In some embodiments, the shared encoder model may include a spatio-temporal transformer model that includes a plurality of attention blocks each of which includes a temporal attention layer and a spatial attention layer.

In some embodiments, the temporal attention layer may be configured to generate a temporal key tensor and a temporal value tensor each of which is based on a different video frame. A spatial attention layer may be configured to generate a spatial key tensor and a spatial value tensor both of which are based on a same video frame. When processing a single image, the temporal attention layer may be configured to treat the single image as a single-frame video by generating, based on the single image, an image-based temporal key tensor and an image-based temporal value tensor.

In some embodiments, the plurality of training videos sampled from the plurality of video datasets may form a training batch and may include at least one training video from each of the plurality of video datasets.

In some embodiments, a number of samples selected from each respective video dataset of the plurality of video datasets may be proportional to a size of the respective video dataset.

In some embodiments, determining the loss value may include determining, for each respective dataset of a plurality of datasets used for training of the action recognition model, a corresponding dataset-specific loss value based on a corresponding inferred classification and a corresponding ground-truth action classification of one or more training samples selected from the respective dataset. Determining the loss value may also include determining a total loss value based on a weighted sum of the corresponding dataset-specific loss value for each respective dataset.

In some embodiments, obtaining the plurality of video datasets may include obtaining a first video dataset having a first set of one or more attribute values for one or more dataset attributes, and obtaining a second video dataset having a second set of one or more attribute values for the one or more dataset attributes. The first set may be different from the second set.

In some embodiments, the one or more dataset attributes may include one or more of: (i) an extent of object appearance bias of training videos in a given video dataset, (ii) an extent of motion bias of training videos in the given video dataset, or (iii) an extent of class diversity represented by training videos in the given video dataset.

In some embodiments, an input video may be obtained. A first action classification for the input video may be determined by the action recognition model and based on the input video. The first action classification may be outputted.

In some embodiments, determining the first action classification may include generating the first action classification by a task-specific action classification head that (i) forms part of the action recognition model and (ii) has been trained, using a task-specific video dataset, to perform a specific task based on an output of the shared encoder model. The task-specific action classification head may have been trained by adjusting one or more parameters of the task-specific action classification head while keeping the parameters of the shared encoder model fixed.

Turning to FIG. 7, block 700 may involve obtaining an input video.

Block 702 may involve determining, by an action recognition model and based on the input video, a first action classification for the input video. The action recognition model may include a shared encoder model and may have been trained using a plurality of action classification heads. A number of the plurality of action classifications heads used to train the action recognition model may be equal to a number of a plurality of video datasets used to train the action recognition model. Each respective action classification head of the plurality of action classification heads may be configured to, based on an output of the shared encoder model, classify training videos sampled from a corresponding video dataset of the plurality of video datasets.

Block 704 may involve outputting the first action classification.

In some embodiments, determining the first action classification may include generating the first action classification by a task-specific action classification head that (i) forms part of the action recognition model and (ii) has been trained, using a task-specific video dataset, to perform a specific task based on an output of the shared encoder model. The task-specific action classification head may have been trained by adjusting one or more parameters of the task-specific action classification head while keeping the parameters of the shared encoder model fixed.

In some embodiments, the action recognition model may have been trained by a training process that includes obtaining the plurality of video datasets each of which includes a corresponding plurality of pairs of (i) a training video and (ii) a corresponding ground-truth action classification thereof. The training process also includes generating the action recognition model that includes the shared encoder model and the plurality of action classification heads, and determining, by the action recognition model and for each respective training video of a plurality of training videos sampled from the plurality of video datasets, a corresponding inferred action classification. The training process further includes determining a loss value based on the corresponding inferred action classification and the corresponding ground-truth action classification of each respective training video of the plurality of training videos, and adjusting one or more parameters of the action recognition model based on the loss value.

In some embodiments, the action recognition model may have been trained by a training process that further includes obtaining a co-training image dataset that includes a plurality of pairs of (i) a co-training image and (ii) a corresponding ground-truth image classification thereof. The training process may also include determining, by the action recognition model and for each respective co-training image of a plurality of co-training images sampled from the co-training image dataset, a corresponding inferred image classification of the respective co-training image. The action recognition model may further include a co-training image classification head connected to the shared encoder model and configured to classify, based on the output of the shared encoder model, co-training images sampled from the co-training image dataset. The loss value may be further based on the corresponding inferred image classification and the corresponding ground-truth image classification of each respective co-training image of the plurality of co-training images. Adjusting the one or more parameters of the action recognition model may include (i) adjusting one or more spatial parameters of a plurality of spatial parameters of the shared encoder model that are associated with processing of spatial properties of an input image data and (ii) adjusting one or more temporal parameters of a plurality of temporal parameters of the shared encoder model that are associated with processing of temporal properties of the input image data.

In some embodiments, the action recognition model may have been trained by a training process that further includes obtaining a pre-training image dataset that includes a plurality of pairs of (i) a pre-training image and (ii) a corresponding ground-truth image classification thereof. The training process may also include determining, by the action recognition model and for each respective pre-training image of a plurality of pre-training images sampled from the pre-training image dataset, a corresponding inferred image classification of the respective pre-training image. The action recognition model may further include a pre-training image classification head connected to the shared encoder model and configured to classify pre-training images sampled from the pre-training image dataset. The training process may additionally include determining a second loss value based on the corresponding inferred image classification and the corresponding ground-truth image classification of each respective pre-training image of the plurality of pre-training images, and adjusting one or more spatial parameters of a plurality of spatial parameters of the shared encoder model based on the loss value while keeping fixed a plurality of temporal parameters of the shared encoder model. The plurality of spatial parameters may be associated with processing of spatial properties of an input image data and the plurality of temporal parameters may be associated with processing of temporal properties of the input image data.

In some embodiments, the shared encoder model may include a spatio-temporal transformer model that includes a plurality of attention blocks each including a temporal attention layer and a spatial attention layer.

In some embodiments, the temporal attention layer may be configured to generate a temporal key tensor and a temporal value tensor each of which is based on a different video frame. A spatial attention layer may be configured to generate a spatial key tensor and a spatial value tensor both of which are based on a same video frame. When processing a single image, the temporal attention layer may be configured to treat the single image as a single-frame video by generating, based on the single image, an image-based temporal key tensor and an image-based temporal value tensor.

In some embodiments, the plurality of training videos sampled from the plurality of video datasets may form a training batch and may include at least one training video from each of the plurality of video datasets.

In some embodiments, a number of samples selected from each respective video dataset of the plurality of video datasets may be proportional to a size of the respective video dataset.

In some embodiments, determining the loss value may include determining, for each respective dataset of a plurality of datasets used for training of the action recognition model, a corresponding dataset-specific loss value based on a corresponding inferred classification and a corresponding ground-truth action classification of one or more training samples selected from the respective dataset. Determining the loss value may also include determining a total loss value based on a weighted sum of the corresponding dataset-specific loss value for each respective dataset.

In some embodiments, obtaining the plurality of video datasets may include obtaining a first video dataset having a first set of one or more attribute values for one or more dataset attributes, and obtaining a second video dataset having a second set of one or more attribute values for the one or more dataset attributes. The first set may be different from the second set.

In some embodiments, the one or more dataset attributes may include one or more of: (i) an extent of object appearance bias of training videos in a given video dataset, (ii) an extent of motion bias of training videos in the given video dataset, or (iii) an extent of class diversity represented by training videos in the given video dataset.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining a plurality of video datasets each comprising a plurality of pairs of (i) a training video and (ii) a corresponding ground-truth action classification of the training video;

generating an action recognition model comprising a shared encoder model and a plurality of action classification heads, wherein a number of the plurality of action classifications heads is equal to a number of the plurality of video datasets, and wherein each respective action classification head of the plurality of action classification heads is configured to, based on an output of the shared encoder model, classify training videos sampled from a corresponding video dataset of the plurality of video datasets;

determining, by the action recognition model and for each respective training video of a plurality of training videos sampled from the plurality of video datasets, a corresponding inferred action classification;

determining a loss value based on the corresponding inferred action classification and the corresponding ground-truth action classification of each respective training video of the plurality of training videos; and adjusting one or more parameters of the action recognition model based on the loss value.

2. The computer-implemented method of claim 1, wherein the shared encoder model comprises a plurality of spatial parameters associated with processing of spatial properties of an input image data and a plurality of temporal parameters associated with processing of temporal properties of the input image data.

3. The computer-implemented method of claim 2, further comprising:

obtaining a co-training image dataset comprising a plurality of pairs of (i) a co-training image and (ii) a corresponding ground-truth image classification thereof; and determining, by the action recognition model and for each respective co-training image of a plurality of co-training images sampled from the co-training image dataset, a corresponding inferred image classification of the respective co-training image, wherein the action recognition model further comprises a co-training image classification head connected to the shared encoder model and configured to classify, based on the output of the shared encoder model, co-training images sampled from the co-training image dataset, wherein the loss value is further based on the corresponding inferred image classification and the corresponding ground-truth image classification of each respective co-training image of the plurality of co-training images, and wherein adjusting the one or more parameters of the action recognition model comprises (i) adjusting one or more spatial parameters of the plurality of spatial parameters and (ii) adjusting one or more temporal parameters of the plurality of temporal parameters.

4. The computer-implemented method of claim 2, further comprising:

obtaining a pre-training image dataset comprising a plurality of pairs of (i) a pre-training image and (ii) a corresponding ground-truth image classification thereof;

determining, by the action recognition model and for each respective pre-training image of a plurality of pre-training images sampled from the pre-training image dataset, a corresponding inferred image classification of the respective pre-training image, wherein the action recognition model further comprises a pre-training image classification head connected to the shared encoder model and configured to classify pre-training images sampled from the pre-training image dataset;

determining a second loss value based on the corresponding inferred image classification and the corresponding ground-truth image classification of each respective pre-training image of the plurality of pre-training images; and adjusting one or more spatial parameters of the plurality of spatial parameters based on the loss value while keeping the plurality of temporal parameters fixed.

5. The computer-implemented method of claim 1, wherein the shared encoder model comprises a spatio-temporal transformer model comprising a plurality of attention blocks each comprising a temporal attention layer and a spatial attention layer.

6. The computer-implemented method of claim 5, wherein the temporal attention layer is configured to generate a temporal key tensor and a temporal value tensor each of which is based on a different video frame, wherein a spatial attention layer is configured to generate a spatial key tensor and a spatial value tensor both of which are based on a same video frame, and wherein, when processing a single image, the temporal attention layer is configured to treat the single image as a single-frame video by generating, based on the single image, an image-based temporal key tensor and an image-based temporal value tensor.

7. The computer-implemented method of claim 1, wherein the plurality of training videos sampled from the plurality of video datasets forms a training batch and comprises at least one training video from each of the plurality of video datasets.

8. The computer-implemented method of claim 7, wherein a number of samples selected from each respective video dataset of the plurality of video datasets is proportional to a size of the respective video dataset.

9. The computer-implemented method of claim 1, wherein determining the loss value comprises:

determining, for each respective dataset of a plurality of datasets used for training of the action recognition model, a corresponding dataset-specific loss value based on a corresponding inferred classification and a corresponding ground-truth action classification of one or more training samples selected from the respective dataset; and determining a total loss value based on a weighted sum of the corresponding dataset-specific loss value for each respective dataset.

10. The computer-implemented method of claim 1, wherein obtaining the plurality of video datasets comprises:

obtaining a first video dataset having a first set of one or more attribute values for one or more dataset attributes; and obtaining a second video dataset having a second set of one or more attribute values for the one or more dataset attributes, wherein the first set is different from the second set.

11. The computer-implemented method of claim 10, wherein the one or more dataset attributes comprise one or more of: (i) an extent of object appearance bias of training videos in a given video dataset, (ii) an extent of motion bias of training videos in the given video dataset, or (iii) an extent of class diversity represented by training videos in the given video dataset.

12. The computer-implemented method of claim 1, further comprising:

obtaining an input video;

determining, by the action recognition model and based on the input video, a first action classification for the input video; and outputting the first action classification.

13. The computer-implemented method of claim 12, wherein determining the first action classification comprises:

generating the first action classification by a task-specific action classification head that (i) forms part of the action recognition model and (ii) has been trained, using a task-specific video dataset, to perform a specific task based on an output of the shared encoder model, wherein the task-specific action classification head has been trained by adjusting one or more parameters of the task-specific action classification head while keeping the parameters of the shared encoder model fixed.

14. A computer-implemented method comprising:

obtaining an input video;

determining, by an action recognition model and based on the input video, a first action classification for the input video, wherein the action recognition model comprises a shared encoder model and has been trained using a plurality of action classification heads, wherein a number of the plurality of action classifications heads used to train the action recognition model is equal to a number of a plurality of video datasets used to train the action recognition model, and wherein each respective action classification head of the plurality of action classification heads is configured to, based on an output of the shared encoder model, classify training videos sampled from a corresponding video dataset of the plurality of video datasets; and outputting the first action classification.

15. The computer-implemented method of claim 14, wherein determining the first action classification comprises:

generating the first action classification by a task-specific action classification head that (i) forms part of the action recognition model and (ii) has been trained, using a task-specific video dataset, to perform a specific task based on an output of the shared encoder model, wherein the task-specific action classification head has been trained by adjusting one or more parameters of the task-specific action classification head while keeping the parameters of the shared encoder model fixed.

16. The computer-implemented method of claim 14, wherein the action recognition model has been trained by a training process comprising:

obtaining the plurality of video datasets each comprising a corresponding plurality of pairs of (i) a training video and (ii) a corresponding ground-truth action classification thereof;

generating the action recognition model comprising the shared encoder model and the plurality of action classification heads;

determining, by the action recognition model and for each respective training video of a plurality of training videos sampled from the plurality of video datasets, a corresponding inferred action classification;

determining a loss value based on the corresponding inferred action classification and the corresponding ground-truth action classification of each respective training video of the plurality of training videos; and adjusting one or more parameters of the action recognition model based on the loss value.

17. The computer-implemented method of claim 14, wherein the shared encoder model comprises a spatio-temporal transformer model comprising a plurality of attention blocks each comprising a temporal attention layer and a spatial attention layer.

18. The computer-implemented method of claim 17, wherein the temporal attention layer is configured to generate a temporal key tensor and a temporal value tensor each of which is based on a different video frame, wherein a spatial attention layer is configured to generate a spatial key tensor and a spatial value tensor both of which are based on a same video frame, and wherein, when processing a single image, the temporal attention layer is configured to treat the single image as a single-frame video by generating, based on the single image, an image-based temporal key tensor and an image-based temporal value tensor.

19. A system comprising:

a processor; and a non-transitory computer-readable medium having stored thereon instructions that, when executed by the processor, cause the processor to perform operations comprising:

obtaining a plurality of video datasets each comprising a plurality of pairs of (i) a training video and (ii) a corresponding ground-truth action classification of the training video;

generating an action recognition model comprising a shared encoder model and a plurality of action classification heads, wherein a number of the plurality of action classifications heads is equal to a number of the plurality of video datasets, and wherein each respective action classification head of the plurality of action classification heads is configured to, based on an output of the shared encoder model, classify training videos sampled from a corresponding video dataset of the plurality of video datasets;

determining, by the action recognition model and for each respective training video of a plurality of training videos sampled from the plurality of video datasets, a corresponding inferred action classification;

determining a loss value based on the corresponding inferred action classification and the corresponding ground-truth action classification of each respective training video of the plurality of training videos; and adjusting one or more parameters of the action recognition model based on the loss value.

20. The system of claim 19, wherein the shared encoder model comprises a plurality of spatial parameters associated with processing of spatial properties of an input image data and a plurality of temporal parameters associated with processing of temporal properties of the input image data.

* * * * *